IMPACT MOWING APPARATUS AND SYSTEM

Original Filed Sept. 16, 1968 5 Sheets-Sheet 1

INVENTOR
NORMAN C. LOCATI

BY ROBERT L. HARRINGTON
ATTORNEY

IMPACT MOWING APPARATUS AND SYSTEM

Original Filed Sept. 16, 1968 5 Sheets-Sheet 2

INVENTOR
NORMAN C. LOCATI

BY ROBERT L. HARRINGTON
ATTORNEY

IMPACT MOWING APPARATUS AND SYSTEM

Original Filed Sept. 16, 1968 5 Sheets-Sheet 3

INVENTOR
NORMAN C. LOCATI

BY ROBERT L. HARRINGTON
ATTORNEY

IMPACT MOWING APPARATUS AND SYSTEM

Original Filed Sept. 16, 1968 5 Sheets-Sheet 4

INVENTOR
NORMAN C. LOCATI

BY ROBERT L. HARRINGTON
ATTORNEY

IMPACT MOWING APPARATUS AND SYSTEM

Original Filed Sept. 16, 1968 5 Sheets-Sheet 5

INVENTOR
NORMAN C. LOCATI

BY ROBERT L. HARRINGTON
ATTORNEY

United States Patent Office

Re. 27,511
Reissued Oct. 24, 1972

27,511

IMPACT MOWING APPARATUS AND SYSTEM

Norman Carl Locati, Lake Oswego, Oreg., assignor to Omark Industries Inc., Portland, Oreg.

Original No. 3,545,188, dated Dec. 8, 1970, Ser. No. 759,831, Sept. 16, 1968. Application for reissue Feb. 17, 1971, Ser. No. 116,179
Int. Cl. A01d *55/24*
U.S. Cl. 56—245 7 Claims

Matter enclosed in heavy brackets [ ] appears in the original patent but forms no part of this reissue specification; matter printed in italics indicates the additions made by reissue.

ABSTRACT OF THE DISCLOSURE

An apparatus and system for mowing vegetation and the like including a cutter bar adapted to mount a driven flexible belt having attached thereto a plurality of cutter elements. Said apparatus and system including means to automatically sharpen the cutter elements with said cutter bar supporting the cutter belt in a horizontally disposed and forwardly projected convex curve. The cutter bar has retaining rails for retaining the cutter belt on the cutter bar during the mowing operation and further includes sheaves that support the cutter belt in a manner whereby clogging is avoided. An accumulator tightening mechanism maintains the belt under a constantly desired tension. Said apparatus and system further includes means whereby the cutter elements are protected from hard objects lying in the path of the mower.

HISTORY OF THE INVENTION

This invention relates to an apparatus and system for mowing vegetation and the like by impact cutting.

For many years the cutting of vegetation such as grain crops and the like which are commonly associated with farming has been accomplished by the process of shearing; i.e., with a sickle-bar type mower. Whereas farming in general has become highly sophisticated with high speed and precision performance equipment, the operation of mowing has experienced only very minor improvements. This is believetd due to the sickle-bar mower being unable to sever certain types of vegetation without being seriously hampered by clogging, and as to those types of vegetation it can sever, having severe limitations as to the speed at which it can be operated and still mow satisfactorily.

The agricultural industry has from time to time tried systems other than sickle-bar mowers and is believed to have tried impact mowing of the type contemplated by the present invention. However, insofar as is known, problems which were encountered rendered these attempts unsuccesful.

BRIEF DESCRIPTION OF THE INVENTION

In the mowing apparatus of the present invention a number of significant problems heretofore experienced with such types of impact mowing have been overcome. Thus the preferred embodiment includes means for fastening the cutter elements to a flexible belt whereby rapid wearing normally associated with such construction is substantially reduced while essentially eliminating the need for lubrication; means for mounting and driving the belt whereby the cutter elements are retained on the cutter bar while subjected to the varying forces of a mowing operation; means for automatically sharpening the cutter elements; means for avoiding breakage of the cutter elements; and various other advantages and improvements which will be more apparent by reference to the following detailed disclosure and drawings wherein:

Figure 1:
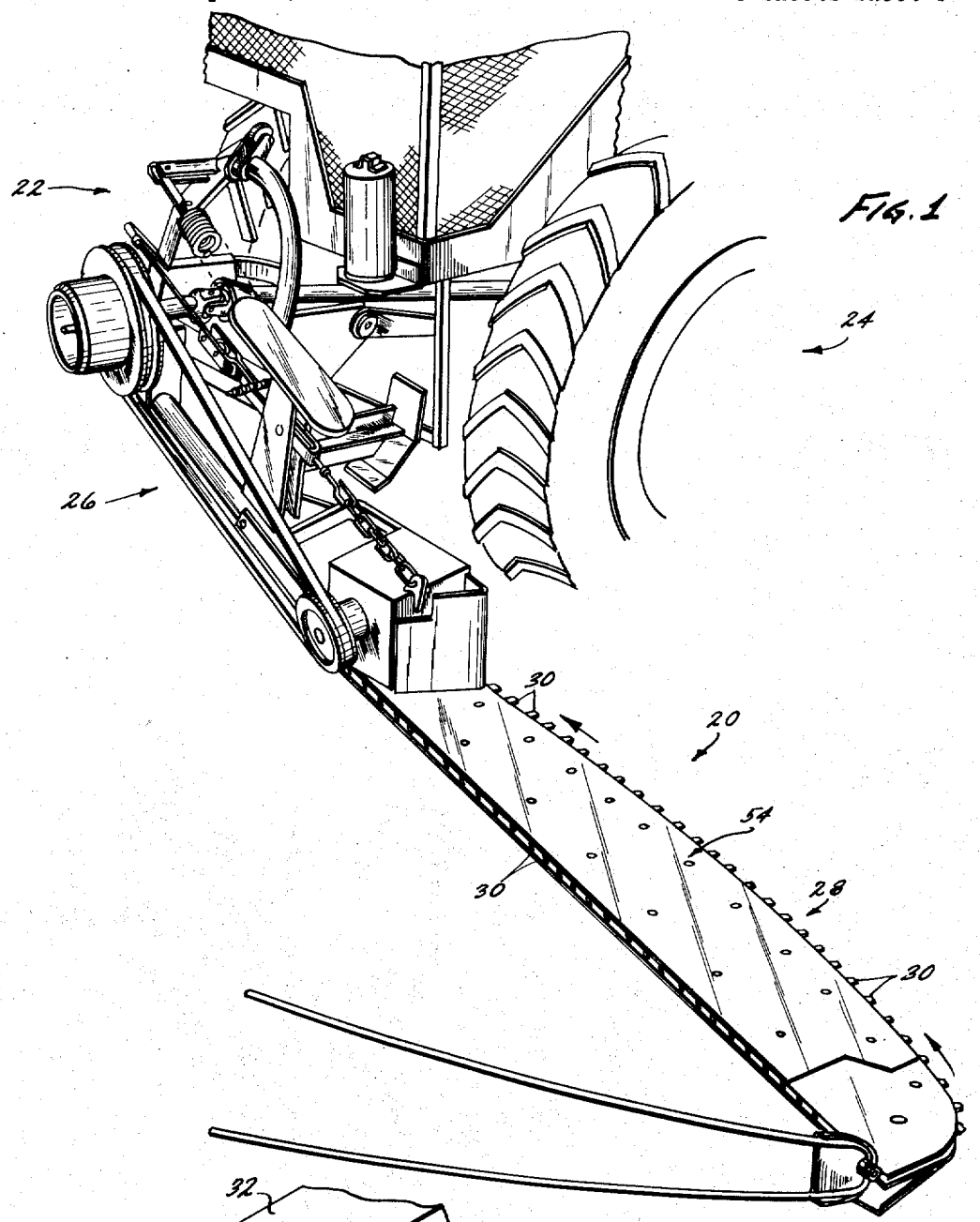
FIG. 1 is a perspective view illustrating a tractor mounted mower apparatus in accordance with the invention.

Referring to FIG. 1 of the drawings, a mower assembly 20 of the present invention is shown mounted on a frame 22 affixed to the rear of a tractor 24. A drive system 26 mounted on the frame 22 drives a cutter belt 28 of the mower assembly 20.

THE CUTTER BELT

Figure 5:
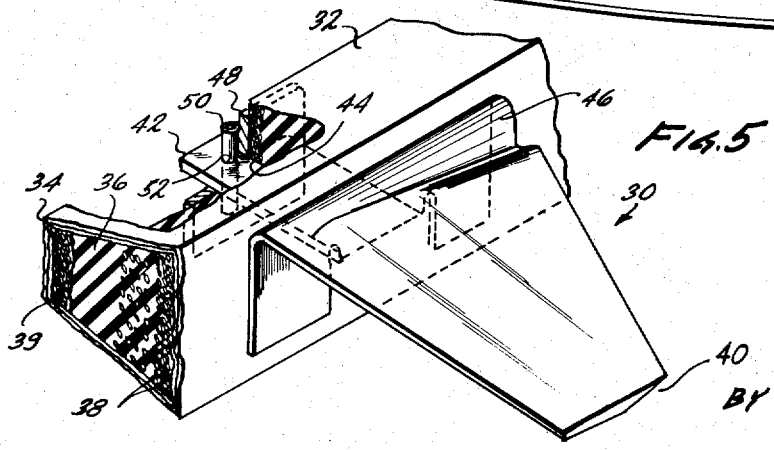
FIG. 5 is an enlarged view of a part of the cutter belt illustrating a preferred means for fastening the cutter elements to the carrier belt.
Figure 2:
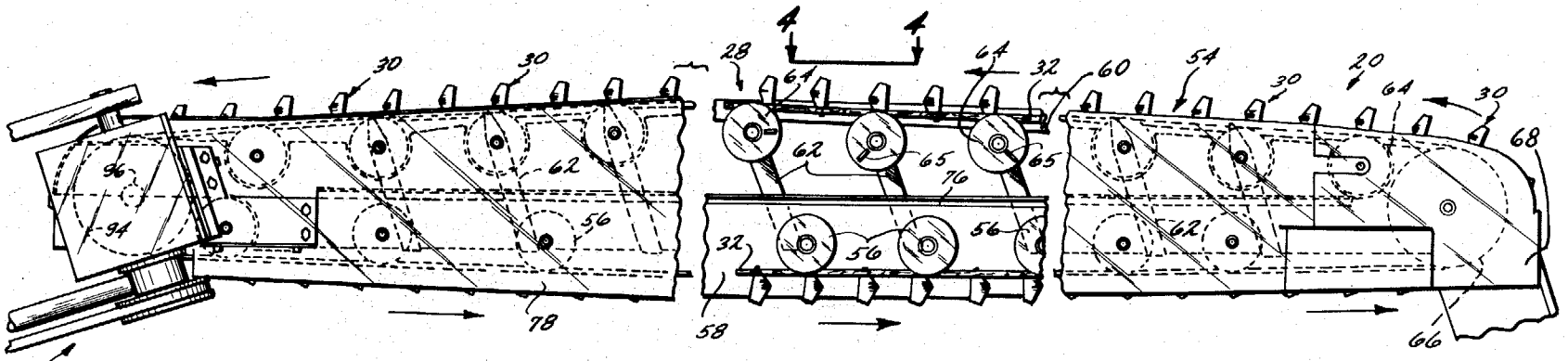
FIG. 2 is a top view of the cutter bar as shown in FIG. 1 with the cover plate partially broken away.

Referring to FIG. 2, the cutter belt 28 comprises cutter elements 30 fastened to a carrier belt 32. A suitable carrier belt may be comprised of a reinforced 5–V size V belt. Referring to FIG. 5, of the drawings illustrating such a belt, a double nylon jacket 34 is formed around an oriented fibre, stock rubber filler material 36. A plurality of cords 38 are embedded in the filler material 36 adjacent the wide or top end of the belt and a woven hard synthetic core 39 is embedded in the filler material 36 adjacent the narrow or bottom end of the belt.

Referring to FIG. 5, cutter elements 30 are formed with a blade 40, a keel 42 that is inserted through a slit 44 in the carrier belt 32, and a base pad 46 between the keel 42 and the blade 40. The base pad 46 limits the extent to which the keel 42 is inserted into the carrier belt 32. The blade 40 is offset about 10 degrees from the direction of travel, i.e., from the belt, and the cutting edge is swept back about 30 degrees from the normal to the direction of travel. A suitable material for the cutter elements 38 is a heat treated and chrome plated medium carbon 8600 alloy type steel that is cold formed to the desired shape.

More specifically an approximate 1 inch by 2½ inch blank of medium carbon alloy steel, .050 inch thick, is cold formed in a series of dies to the desired shape, e.g.

as illustrated in FIG. 5. The cutter element in the annealed state is then passed through a controlled atmosphere hardening heat treat process permitting Rockwell readings of 49–50 RC. The cutter is lastly selectively shot peened, hard chrome plated and baked. A break line is provided on the top of the keel whereby the blade will break off before damaging the more expensive carrier belt.

The cutter elements 30 are secured to the carrier belt 32 by first placing a washer 48 over the end of the keel that protrudes through the bottom of the carrier belt 32. A roll pin 50 is then inserted into an opening 52 provided in the protruded end of the keel. The washer 48 pivots on the roll pin 50 as the cutter belt passes around the drive and reversing sheaves. This pivotal arrangement provides the needed secure fastening of the cutter elements to the carrier belt while at the same time minimizing damage to the carrier belt by reason of the rigid washer digging into the carrier belt as it flexes and unflexes while going around the sheaves.

THE CUTTER BAR

Figure 3:
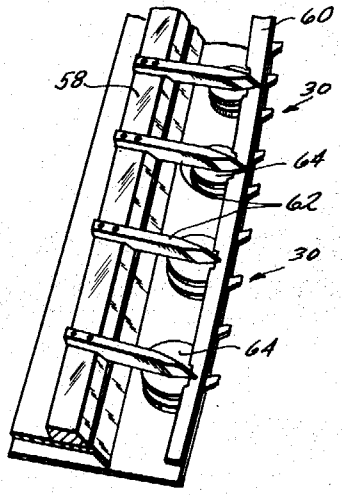
FIG. 3 is a partial bottom view of the cutter bar as shown in FIG. 2.

As most clearly shown in FIG. 2 the cutter belt 28 is mounted for driven rotation on a cutter bar 54. Rear idler sheaves 56 are pivotally mounted on a main brace 58. A convexly curved guard member 60 forms the leading edge of the cutter bar 28 (see also FIG. 3). Although the curvature of the guard member 60 may be varied, it is preferred that this curvature essentially forms a catenary curve. Support runners 62 extend between the main brace 58 and the guard member 60. The support runners 62 are adapted to ride on the ground for supporting the cutter bar during a mowing operation. Front idler sheaves 64 are pivotally mounted to the top of the support runners 62 to form a convexly curved pattern that conforms to the curvature of the guard member 60. A reverse sheaves 66 is mounted on an end plate 68 slidably carried by the outer end of the main brace 58. Thus the reverse sheave 66 can be urged outwardly with respect to the main brace 58 to tighten a cutter belt 28 entrained on the sheaves of the cutter bar.

Urging of the end plate 68 relative to the main brace 58 is accomplished by an accumulator tightening mechanism 70. A cylinder 72 is mounted to the main brace and a piston 74 extending from the cylinder 72 is connected to the end plate 68. Nitrogen gas is sealed in a first chamber inside the cylinder with the movable piston providing one wall of said first chamber. A hydraulic fluid is contained in a second chamber with a movable wall separating the first and second chambers. A hydraulic line 76 extending from a hydraulic pump located on the tractor 24 to the second chamber of the cylinder maintains a desired pressure within said second chamber. This pressure is transformed through the movable wall to the nitrogen gas which in turn transfers the pressure through the piston 74 to the end plate 68 and reverse sheave 66. The nitrogen being compressible, acts similar to a uniformly tensioned spring to continuously urge the end plate outwardly. The pressure is easily varied by adjusting the fluid pressure of the hydraulic pump. The preferred accumulator tightening mechanism is approximately quart size to provide substantially plus or minus 1% accuracy.

Figure 4:
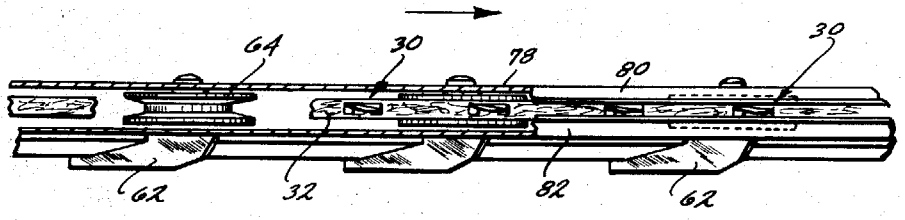
FIG. 4 is an enlarged front view of a portion of the cutter bar taken on line 4—4 of FIG. 2.

As shown in FIGS. 2 and 4, a top plate 78 is provided to fit over the front and rear idler sheaves 56 and 64. An upper flange or retaining rail 80 extends downwardly from the front edge of the top plate 78 (FIG. 4) to a point just above the normal path of the cutter elements 30. It will be noted that the underside of the cutter bar shown in FIG. 3 between the main brace 58 and the guard member 60 is substantially open (being occupied only by the support runners 62) to avoid buildup of dead grass and the like. The space between the sheaves and the top plate is prevented from being clogged with the mown grass by providing a radial embossment or impeller 65 on the top of the idler sheave which effectively removes such grass.

SHARPENING APPARATUS AND DRIVE MECHANISM

Figure 6:
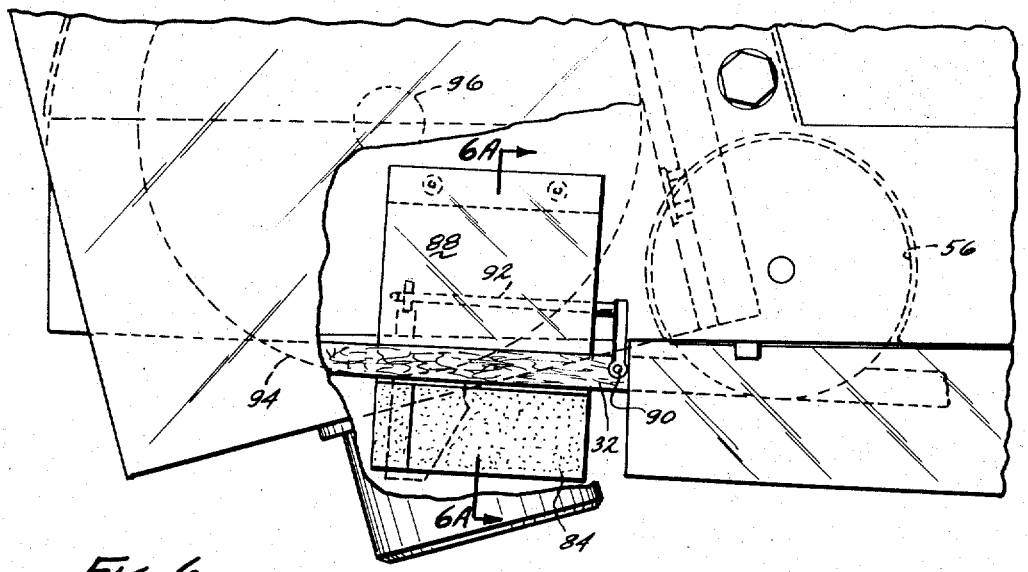
FIG. 6 is a sectional view showing the drive assembly and sharpening mechanism for the mower apparatus of FIG. 1.
Figure 6A:
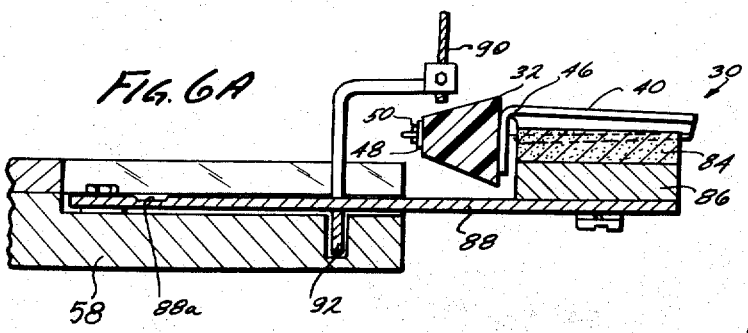
FIG. 6A is a sectional view taken on lines 6A—6A of FIG. 6.
Figure 20:
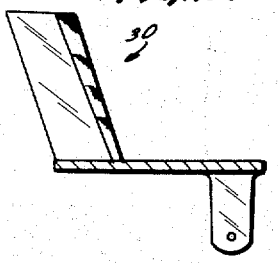
FIGS. 9 through 21 illustrate alternate forms of cutter elements.

FIGS. 6 and 6A illustrate the means for sharpening the cutter elements 30. A sharpening stone 84 is centered to a metal base 86 that is carried on the end of an arm 88. The arm is pivotally mounted to the main brace 58. The arm 88 has a notch 88A that acts as a spring loaded hinge to enable the arm 88 and stone 84 carried thereby to be bent upwardly toward the cutter elements 30. A laver 92 located under the arm 88 is connected to a cable 90 that can be actuated by the operator of the tractor 24 to raise the arm 88 and force the sharpening stone 84 into sharpening engagement with the underside of the cutter elements 30. The carrier belt 32 is driven around the cutter bar by a drive sheave 94 having a drive shaft 96 connected to the power drive of the tractor 24. The sharpening stone 84 is positioned to engage the cutter elements 30 just after they leave the drive sheave 94 where the cutter elements are maintained sufficiently stable against the off-setting force of the sharpening stone.

ALTERNATE EMBODIMENTS

Figure 8:
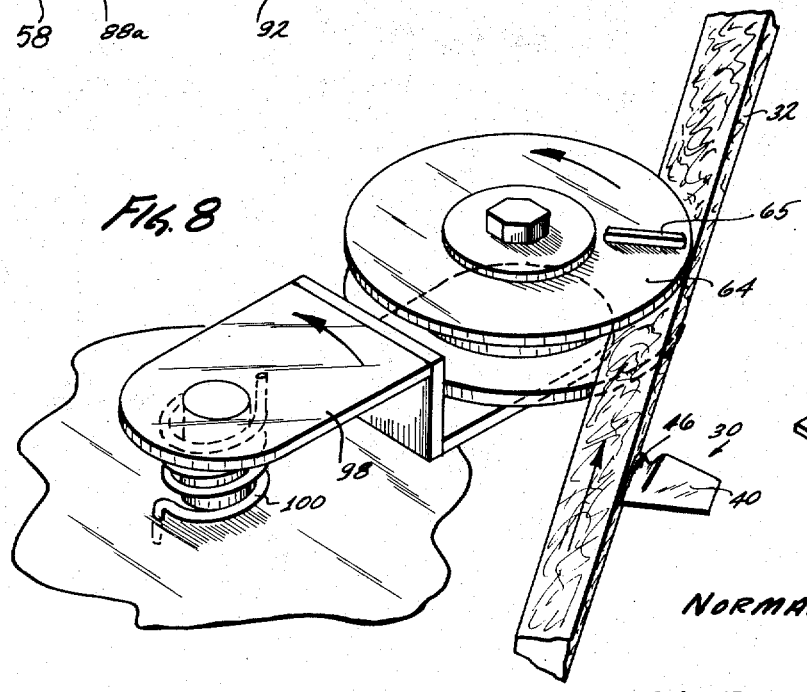
FIG. 8 illustrates an alternate means for mounting the front sheaves of the cutter bar.
Figure 21:
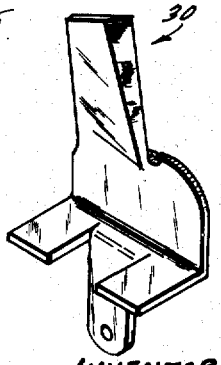
Figure 7:
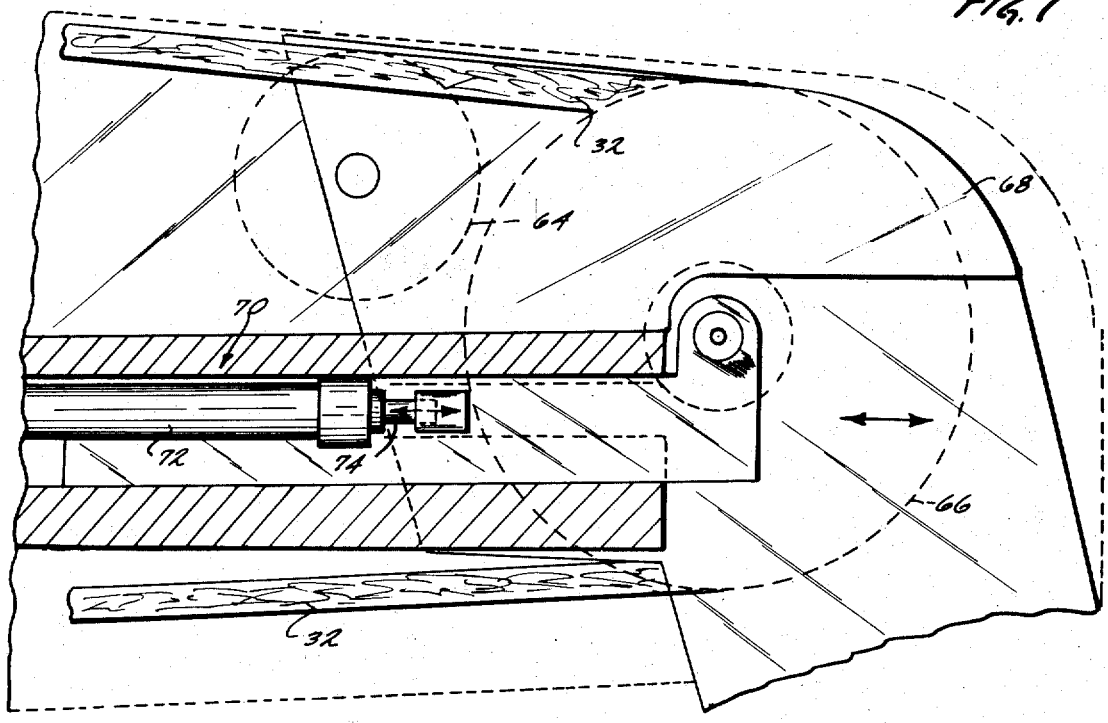
FIG. 7 is a top plan view with portions removed showing the reverse pulley and adjustment mechanism at the outer end of the cutter bar.

During the operation of mowing grass for hay for example, it is common for the mower to be accidently run against rocks and the like hidden from the operator's view by the unmown grass. To prevent severe damage to the mower, the cutter bar of conventional sickle-bar mowers is provided with a break-away feature whereby when a solid object is struck, a safety catch is released and the bar is permitted to fold back behind the tractor. A similar feature can be provided on the present apparatus. However, before the safety catch can be released, because of the rapid speed at which the cutter belt travels, a number of cutter elements 30 may be driven against the hard objects and broken. To minimize such breaking of the cutter elements in the alternate embodiment of FIG. 8, front idler sheaves 64 are mounted on a swing-away run 98 that is pivotally connected to the cutter bar. The front idler sheaves 64 are thus moveable between a forward position with the cutter elements 30 projected forwardly of the guard member 60 and top plate 78, and a rearward position with the cutter elements 30 retracted behind the guard member 60 and top plate 78. A torsional spring 100 urges the arm 98 and front idler sheaves 64 carried thereby to the forward position. When a solid object is engaged, the arm 98 is forced against the torsional spring 100 to retract the idler sheaves and draw the cutter elements behind the guard member and top plate.

THE SWING-AWAY CUTTERS

Figure 9:
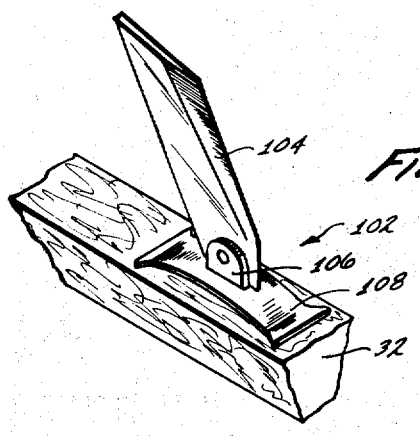

Another means for minimizing breakage is the provision of a swing-away cutter element, various forms of which are shown in FIGS. 9 through 12. Referring to FIG. 9, a blade 104 of the cutter element 102 is pivotally connected to a keel 106. A spring washer 108 through which the keel 106 is inserted, is abutted against a flat area on the end of the blade in a manner to maintain the blade in an extended position. When a hard object is struck, the blade 104 is folded against the spring biasing pressure of the spring washer behind the guard member 60 and top plate 78.

Figure 10:
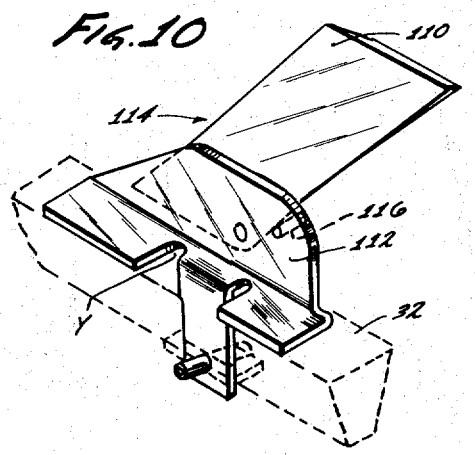

A second form of a swing away cutter element is shown in FIG. 10. A blade 110 is pivotally connected to a base pad 112 of a cutter element 114. A shear pin 116 on the base pad 112 located behind the blade 110 maintains the blade in a normally extended position. Striking a hard object causes the shear pin 116 to break and then the blade folds back into the protection of the guard member 60 and top plate 78.

Figure 11:
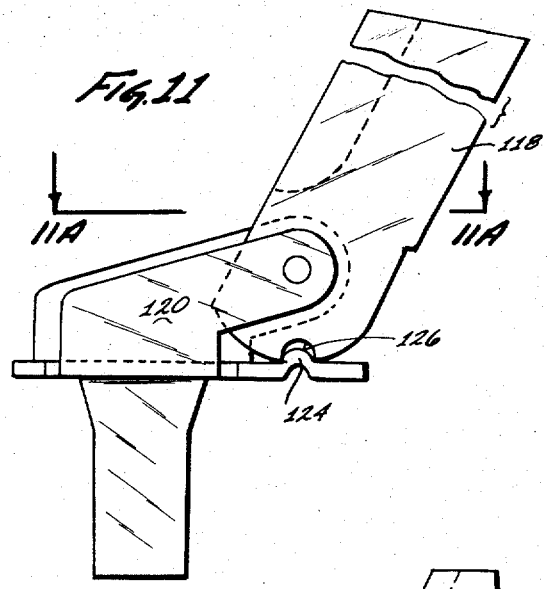
Figure 11A:
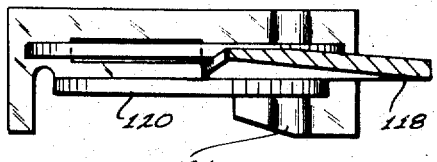

A third form of a swing-away cutter element is shown in FIGS. 11 and 11A. The blade 118 is pivotally connected to an ear portion of base pad 120 of the element.

An embossment 124 on the base pad 120 is adapted to mate with a notch 126 on the blade 118 when the blade is in its extended position. Striking a hard object will spring the blade and base pad and the blade will fold back into the cutter bar.

Figure 12:
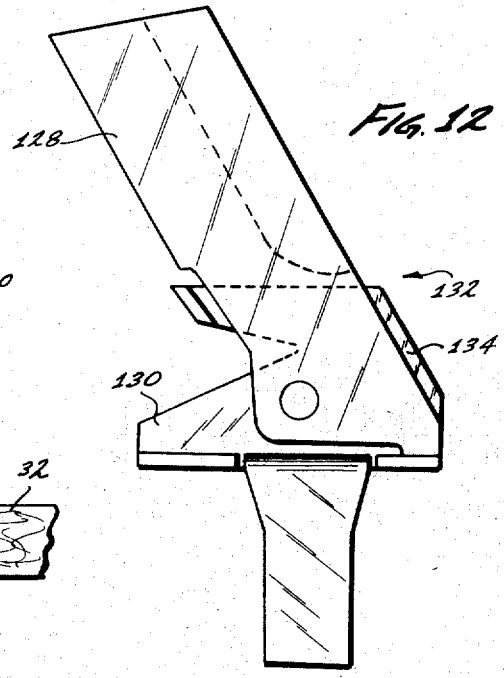

A still fourth form of a swing-away cutter element is shown in FIG. 12. A blade 128 is pivotally connected to a base pad 130 of a cutter element 132. The blade is maintained in its extended position by a supporting flange 134 on the base pad 130. Striking a hard object will spring the flange 134 and the blade will fold back behind the protection of the cutter bar.

In certain applications for the mower, the blade of the cutter element can be relatively blunt and still satisfactorily cut. In such applications a very thin blade of about .025 to .030 inch thick can be employed without having to provide a sharpened edge thereon.

OTHER MODIFICATIONS OF CUTTER ELEMENTS

Figure 13:
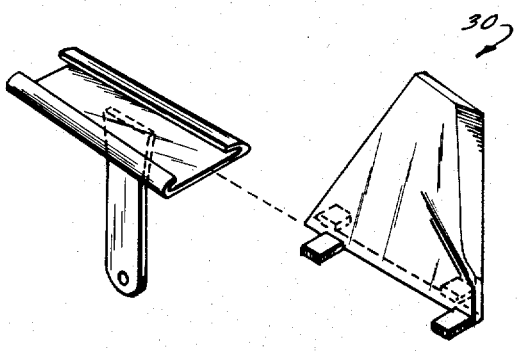

Although the cutter element shown in FIG. 5 is preferred where the swing-away feature is not desired, still other forms may be suitable and in some instances preferred. Thus, for example, see the cutter element of FIG. 13 where the blade is shown as being removable from the base pad to permit easy replacement of the blade.

Figure 14:
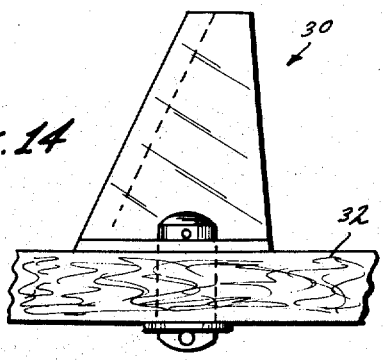

See also the cutter element of FIG. 14 where the keel is separate from the base pad and is pivotally attached to the base pad by a second roll pin inserted through the upper end of the keel that protrudes through the base pad.

Figure 15:
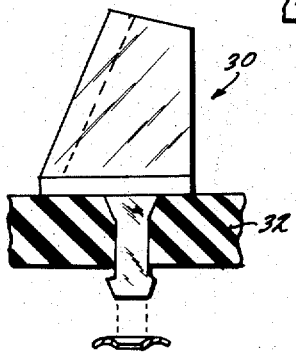
Figure 17:
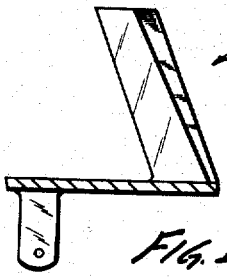
Figure 18:
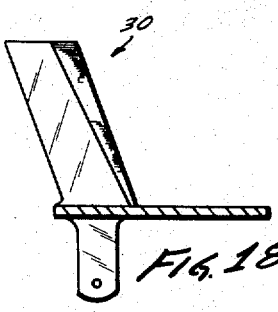
Figure 16:
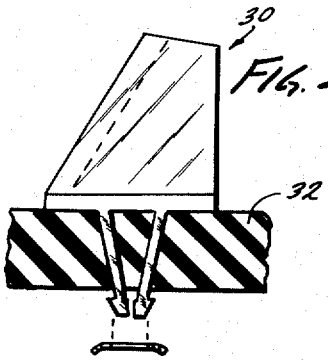
Figure 19:
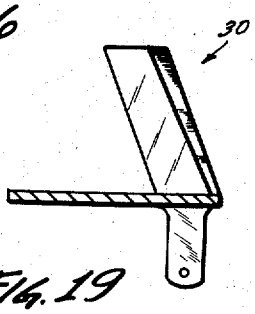

FIGS. 15 and 16 illustrate a form of cutter element wherein a clip-on type washer eliminates the need for the roll pin of the previous cutter elements.

FIGS. 17 through 21 all illustrate other forms of cutter elements usable with the present mowing apparatus and system.

OPERATION

The above described apparatus and system is believed to provide the first successful impact cutting mower suitable for agricultural needs and the like. The cutter belt of the present invention is preferably driven at a high rate of speed, e.g. 6,000 to 8,000 feet per minute, at which speeds it is capable of severing thick stands of grass and the like while running the tractor at speeds up to fifteen or more miles per hour. Conventional shear cutting mowers when severing an average stand of grass permit tractor speeds of about six to eight miles per hour.

The successful operation of the present apparatus is believed achieved by a combination of features whereby down time of the mower is minimized. These features are described and illustrated in the above described preferred embodiment of the invention. However, it will be understood that the described apparatus is set forth to illustrate and not to limit the invention and thus various alternate combinations and changes may be made by those skilled in the art without departing from the scope of the invention. The scope of the invention is therefore limited only by the following claims appended hereto.

What is claimed is:

1. An impact mowing apparatus comprising; a cutter bar, [a drive sheave] *cutter belt drive means* mounted on one end of the cutter bar and [a reverse sheave] *cutter belt reversing means* mounted on the other end of the cutter, bar, a first [series of idler sheaves] *cutter belt guide means comprising a series of spaced apart guide members* mounted on the leading edge of the cutter bar defining a forwardly projected convex curve between the [drive sheave and reverse sheave] *cutter belt drive means and cutter belt reversing means,* a second [series of idler sheaves] *cutter belt guide means* on the trailing edge of the cutter bar, a cutter belt mounted for driven rotation on the [drive reverse and idler sheaves] *cutter belt drive means, reversing means and first and second guide means,* said cutter belt having a plurality of cutter elements fastened to a carrier belt, and a guard member provided across the leading edge of the cutter bar adjacent to and below the convex curved path of the cutter elements, said guard member being a continuous rail substantially parallel to said convex curved path, *the spacing of said guide members* [said guard member] permitting said cutter elements to retract [therebehind] *behind the guard member* upon engagement of said elements with an obstable in a field to be mown.

2. An impact cutting mower apparatus as defined in claim 1 wherein *the first cutter belt guide means comprises a first series of idler sheaves,* a top plate is provided on the cutter bar over the first series of idler sheaves, and radial embossments are provided on the top of the first series of idler sheaves to inhibit jamming of severed vegetation between the first series of idler sheaves and the top plate.

3. An impact cutting mower apparatus as defined in claim 1 wherein *the cutter belt drive means comprises a drive sheave,* the cutter elements have a blade that defines a plane that is angularly offset from the direction of travel of the carrier belt, and including a sharpening mechanism attached to the cutter bar at a point where the cutter belt leaves the drive sheave, said sharpening mechanism including a sharpening stone having a flat portion carried by one end of an arm having the other end connected to the cutter bar, and means for moving the arm to draw the sharpening stone against the cutter element with the flat portion substantially parallel to the direction of travel of the belt for engaging the leading edge of the blade.

4. An impact cutting mower apparatus as defined in claim 1 wherein *the cutter belt reversing means comprises a reverse sheave,* the reverse sheave is mounted for longitudinal sliding movement relative to the cutter bar, and tightening means for urging such sliding movement of the reverse sheave to tighten the cutter belt entrained on the cutter bar, said tightening means being an accumulator having a cylinder mounted on the cutter bar and a piston interconnected with the reverse [pulley] *sheave,* a hydraulic fluid chamber within the cylinder and a compressible gas between the chamber and the piston, and a hydraulic fluid line connected to the chamber for controlling the pressure therein to compress the gas and thereby urge the piston and reverse [pulley] *sheave* interconnected therewith outwardly.

5. An impact cutting mower apparatus as defined in claim 1 wherein releasable fastening means fasten the cutter elements to the carrier belt, said releasable fastening means providing a pivotal connection for the cutter elements to pivot rearwardly relative to the cutter belt and retaining the cutter elements in extended position during normal cutting operation.

6. An impact cutting mower apparatus as defined in claim 1 including a top plate provided over the cutter bar, said top plate having a leading edge that conforms to the leading edge of the guard member, a downwardly projecting flange on the leading edge of the top plate forming a top rail over the cutter elements of the cutter belt as it is driven on the cutter bar, and an upwardly projecting flange on the leading edge of the guard member forming a bottom rail under the cutter elements of the cutter belt.

7. An impact cutting mower apparatus as defined in claim 6 wherein *the first cutter belt guide means comprises a first series of idler sheaves,* the first series of idler sheaves are each mounted on one end of a swing-away arm that is pivotally connected at the other end to the cutter bar, and a spring for urging the free end of the swing-away arm to a forward position where the sheaves support the cutter belt with the cutter elements projected forwardly of the top and bottom rails, said swing-away arm adapted to be pivoted to a rear position against the urging of the spring where the cutter elements are retracted behind the top and bottom rails.

(References on following page)

References Cited

The following references, cited by the Examiner, are of record in the patented file of this patent or the original patent.

UNITED STATES PATENTS

| | | | |
|---|---|---|---|
| 492,322 | 2/1893 | Brown | 56—292 |
| 2,481,364 | 9/1949 | Strong | 56—244 X |
| 2,514,861 | 7/1950 | Hackerott | 56—245 X |
| 2,543,386 | 2/1951 | Templeton | 56—244 X |
| 2,728,181 | 12/1955 | Carpenter | 56—244 X |
| 2,744,376 | 5/1956 | Miner | 56—290 X |
| 2,782,582 | 2/1957 | McClearen | 56—244 X |
| 2,793,487 | 5/1957 | Wobermin | 56—290 X |

| | | | |
|---|---|---|---|
| 2,941,345 | 6/1960 | Schaeffer | 56—245 X |
| 3,043,079 | 7/1962 | Aston | 56—244 X |
| 3,397,524 | 8/1968 | Hofer | 56—290 |

FOREIGN PATENTS

| | | |
|---|---|---|
| 760,827 | 11/1956 | Great Britain. |
| 188,777 | 1/1965 | U.S.S.R. |
| 162,495 | 3/1949 | Germany. |

F. BARRY SHAY, Primary Examiner

J. A. OLIFF, Assistant Examiner

U.S. Cl. X.R.

56—292